United States Patent
Li et al.

(10) Patent No.: US 10,833,746 B2
(45) Date of Patent: Nov. 10, 2020

(54) METHOD FOR TRANSMITTING A CHANNEL STATE INFORMATION-REFERENCE SIGNAL, PROCESSOR, BASE STATION AND STORAGE MEDIUM

(71) Applicant: ZTE CORPORATION, Guangdong (CN)

(72) Inventors: Yong Li, Shenzhen (CN); Zhaohua Lu, Shenzhen (CN); Hao Wu, Shenzhen (CN); Chuangxin Jiang, Shenzhen (CN); Yuxin Wang, Shenzhen (CN); Huahua Xiao, Shenzhen (CN); Yijian Chen, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/733,011

(22) PCT Filed: Mar. 22, 2018

(86) PCT No.: PCT/CN2018/080084
§ 371 (c)(1),
(2) Date: Sep. 24, 2019

(87) PCT Pub. No.: WO2018/171687
PCT Pub. Date: Sep. 27, 2018

(65) Prior Publication Data
US 2020/0028557 A1 Jan. 23, 2020

(30) Foreign Application Priority Data
Mar. 24, 2017 (CN) .......................... 2017 1 0184867

(51) Int. Cl.
*H04B 7/06* (2006.01)
*H04L 1/00* (2006.01)
(Continued)

(52) U.S. Cl.
CPC .......... *H04B 7/0626* (2013.01); *H04L 1/0026* (2013.01); *H04L 5/001* (2013.01); *H04L 5/0048* (2013.01); *H04W 72/0446* (2013.01)

(58) Field of Classification Search
CPC ..... H04L 5/0023; H04L 1/0003; H04L 5/006; H04B 7/0417
See application file for complete search history.

(56) References Cited

U.S. PATENT DOCUMENTS

| 10,637,550 B2* | 4/2020 | Park ................. H04B 7/0626 |
| 2013/0258964 A1 | 10/2013 | Nam et al. |
| 2014/0119228 A1 | 5/2014 | Wang et al. |

FOREIGN PATENT DOCUMENTS

| CN | 102111879 A | 6/2011 |
| CN | 102869105 A | 1/2013 |

(Continued)

OTHER PUBLICATIONS

International Search Report of Application No. PCT/CN2018/080084—4 pages (dated Jun. 4, 2018).

*Primary Examiner* — Chandrahas B Patel
(74) *Attorney, Agent, or Firm* — Knobbe, Martens, Olson & Bear, LLP

(57) ABSTRACT

Disclosed are a method and device for transmitting a channel state information-reference signal, a processor and a storage medium. The method includes: determining, by a base station, channel state information-reference signal, where the channel state information-reference signal at least includes the number of CSI-RS ports and information of components, the CSI-RS ports are used for transmitting the CSI-RS, and a CSI-RS resource is used for carrying the CSI-RS; sending, by the base station, the information of the CSI-RS to a terminal; and transmitting, by the base station, the CSI-RS. In such a way, the technical problems in the (Continued)

related art of poor channel measurement performance and high system complexity are solved.

19 Claims, 2 Drawing Sheets

(51) Int. Cl.
    *H04L 5/00*           (2006.01)
    *H04W 72/04*        (2009.01)

(56)          References Cited

FOREIGN PATENT DOCUMENTS

| CN | 103856310 A | 6/2014 |
|----|-------------|--------|
| WO | 2013147565 A2 | 10/2013 |

\* cited by examiner

METHOD FOR TRANSMITTING A CHANNEL STATE INFORMATION-REFERENCE SIGNAL, PROCESSOR, BASE STATION AND STORAGE MEDIUM

CROSS REFERENCE TO RELATED APPLICATIONS

This is a U.S. National Stage Application, filed under 35 U.S.C. 371, of International Patent Application No. PCT/CN2018/080084, filed on Mar. 22, 2018, which claims priority to Chinese patent application No. 201710184867.0 filed on Mar. 24, 2017, contents of both of which are incorporated herein by reference in their entireties.

TECHNICAL FIELD

The present disclosure relates to the field of communications and, in particular, to a method and device for transmitting channel state information-reference signal, a processor and a storage medium.

BACKGROUND

Long Term Evolution (LTE)/LTE-Advanced (LTE-A) is the mainstream of the 4th Generation mobile communication technology (4G). A Channel State Information-Reference Signal (CSI-RS) is introduced into the LTE-A for a terminal to predict a channel state. The CSI-RS transmitted with non-zero power is called non-zero-power CSI-RS (NZP CSI-RS). Sometimes, in order to avoid interference, it needs to avoid data transmission in some resource elements (REs) on a Physical Downlink Shared Channel (PDSCH), and the avoidance is implemented by a zero-power CSI-RS manner, which is called zero-power CSI-RS (ZP CSI-RS), and a corresponding RE set is the ZP CSI-RS resource. Sometimes, in order to measure the interference, the CSI-RS is transmitted with zero power, and at this point, a corresponding RE set is called Channel-State Information-Interference Measurement Resource (CSI-IM Resource).

The CSI reference signal configuration (i.e., CSI-RS configuration) is used for indicating an RE to which the CSI-RS is mapped, that is, the RE used by the CSI-RS transmission, and CSI-RS configuration serial numbers are used for distinguishing different CSI-RS configurations. The CSI reference signal subframe configuration (CSI-RS subframe configuration) is used for indicating a subframe in which CSI-RS transmission is located.

With the development of production, life and scientific research technologies, the 5th Generation (5G) wireless communication technology is demanded. The 5G wireless technology is characterized by large-bandwidth massive-Multiple-Input Multiple-Output (massive-MIMO) beam technology, and needs to meet requirements of large-scale data transmission, low-delay transmission, Internet of Things transmission and high-speed transmission. 3GPP organized researches on New Radio (NR) access technology. The NR can adapt a frequency range from 0.6 GHz to 100 GHz, can configure a spacing between subcarriers, and can configure a length of subframes or time slots in the time domain. Data transmission can be performed in a configured Orthogonal Frequency Division Multiplexing (OFDM) symbol. A pattern and position of a data demodulation reference signal need to be configurable. Beams can be changed between OFDM symbols, and the beams can be changed even within the OFDM symbol. The CSI-RS also needs to be introduced into the NR to support channel state information measurement, beam management and channel phase tracking. The NR requires that the CSI-RS can be transmitted in the following three manners: a periodic transmission, a semi-persistent transmission, and an aperiodic transmission.

In the related art, the reference signal transmission method increases a system complexity and has poor channel measurement performance.

SUMMARY

In view of the above, embodiments of the present disclosure are expected to provide a method and device for transmitting a channel state information-reference signal, a processor and a storage medium, to at least solve problems in the related art of poor channel measurement performance and high system complexity.

In a first aspect, the embodiments of the present disclosure provide a method for transmitting a CSI-RS. The method includes steps described below.

A base station determines information of a CSI-RS, where the information of the CSI-RS at least includes the number of CSI-RS ports and information of components, the CSI-RS ports are used for transmitting the CSI-RS, and a CSI-RS resource is used for carrying the CSI-RS. The base station sends the information of the CSI-RS to a terminal. The base station transmits the CSI-RS.

In a second aspect, the embodiments of the present disclosure provide a device for transmitting a CSI-RS. The device includes a determining unit, a sending unit and a transmitting unit.

The determining unit is configured to determine information of the CSI-RS, where the information of the CSI-RS at least includes the number of CSI-RS ports and information of components, the CSI-RS ports are used for transmitting the CSI-RS, and a CSI-RS resource is used for carrying the CSI-RS. The sending unit is configured to send the information of the CSI-RS to a terminal. The transmitting unit is configured to transmit the CSI-RS.

In a third aspect, the embodiments of the present disclosure further provide a storage medium. The storage medium includes stored programs which, when executed, execute the method for transmitting a CSI-RS.

In a fourth aspect, the embodiments of the present disclosure further provide a processor. The processor is configured to execute programs. The processor, when executing the programs, executes the method for transmitting a CSI-RS.

In a fifth aspect, the embodiments of the present disclosure further provide a base station. The base station includes a processor, a memory and a transceiver.

The memory is configured to store executable instructions.

The transceiver is configured to perform information transceiving communication according to control of the processor.

The processor is configured to execute following operations:

determining information of the CSI-RS, where the information of the CSI-RS at least includes the number of CSI-RS ports and information of components, the CSI-RS ports are configured to transmit the CSI-RS, and a CSI-RS resource is used for carrying the CSI-RS;

sending the information of the CSI-RS to a terminal; and transmitting the CSI-RS.

In the embodiments of the present disclosure, a base station determines information of the CSI-RS, where the information of the CSI-RS at least includes the number of CSI-RS ports and information on components of a CSI-RS resource, the CSI-RS ports are used for transmitting the CSI-RS, and the CSI-RS resource is used for carrying the CSI-RS; the base station sends the information of the CSI-RS to a terminal; and the base station transmits the CSI-RS. In such a way, problems in the related art of poor channel measurement performance and high system complexity are solved, achieving technical effects of reducing system complexity and improving channel state measurement performance.

BRIEF DESCRIPTION OF DRAWINGS

The drawings described herein are used to provide an understanding of the present disclosure, and form a part of the present application. The exemplary embodiments and descriptions thereof in the present disclosure are used to explain the present disclosure, and do not limit the present disclosure in any improper way. In the drawings.

DETAILED DESCRIPTION

The present disclosure will be described in detail with reference to the drawings and embodiments. It is to be understood that the specific embodiments described herein are intended to explain and not to limit the present disclosure.

It is to be noted that the terms "first", "second" and the like in the description, claims and drawings of the present disclosure are used to distinguish between similar objects and are not necessarily used to describe a particular order or sequence. A channel state information-reference signal (CSI-RS) configuration is a CSI-RS configuration with the certain number of antenna ports, such as a CSI-RS configuration with a configuration serial number of 0 and with the 8 antenna ports. The configuration serial number generally is an index number.

The related art supports CSI-RS resources with the number of ports of 1, 2, 4, 8, 12 and 16, and CSI-RS resource element patterns with these numbers of ports are repeated in each physical resource block (PRB) pair in a bandwidth range in a transmission subframe.

CSI-RS resources with 1 port, 2 ports, 4 ports and 8 ports are composed of a signal CSI-RS configuration, and CSI-RS resources with 12 ports, 16 ports, 20 ports, 24 ports, and 32 ports are aggregated with multiple CSI-RS configurations.

A base station or a terminal generally measures a channel state through a CSI process, one or more CSI-RS resources are generally configured in one CSI process, and the terminal performs feedback according to the measurement of the CSI-RS.

In order to fully utilize power and improve the precision of channel measurement, the ports can be divided into multiple small groups, and the ports in the small group operate in a code division multiplexing manner.

The base station notifies the terminal of information on the CSI-RS through upper layer signaling, including CSI-RS resource configuration identity, the number of CSI-RS ports, a CSI-RS configuration and a CSI-RS subframe configuration.

In embodiments of the present disclosure, a base station determines information of the CSI-RS, where the information of the CSI-RS at least includes the number of CSI-RS ports and information on components of a CSI-RS resource, the CSI-RS ports are used for transmitting the CSI-RS, and the CSI-RS resource is used for carrying the CSI-RS; the base station sends the information of the CSI-RS to a terminal; and the base station transmits the CSI-RS.

Embodiment 1

Figure 1:
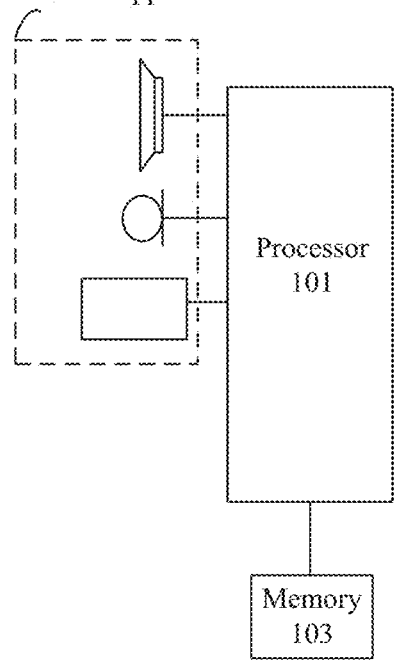
FIG. 1 is a schematic diagram of a terminal for executing a method for transmitting a channel state information-reference signal according to an embodiment of the present disclosure.

A method embodiment provided by the embodiment 1 of the present application may be executed in a mobile terminal, a computer terminal or other similar computing apparatuses. In an example the method is executed on the computer terminal (i.e., a computer terminal with the base station), as shown in FIG. 1, a computer terminal may include one or more (only one is shown in FIG. 1) processors 101 (the processor 101 may include, but is not limited to, a microprocessor such as a micro control unit (MCU), a programmable logic device such as a field-programmable gate array (FPGA) or other processing devices), a memory 103 used for storing data, and a transceiver 105 used for implementing a communication function. It should be understood by those skilled in the art that the structure shown in FIG. 1 is merely illustrative, and not intended to limit the structure of the electronic apparatus described above.

The memory 103 may be configured to store software programs and modules of application software, such as program instructions/modules corresponding to a device control method in the embodiments of the present disclosure. The processors 101 execute the software programs and modules stored in the memory 103 to perform various functional applications and data processing, that is, to implement the method described above. The memory may include a high-speed random access memory, and may further include a nonvolatile memory, such as one or more magnetic storage apparatuses, flash memories or other nonvolatile solid-state memories. In some examples, the memory may include memories which are remotely disposed relative to the processor and these remote memories may be connected to the computer terminal via a network. Examples of the above network include, but are not limited to, the Internet, an intranet, a local area network, a mobile communication network and a combination thereof.

The transceiver 105 is configured to receive or send data via a network. The above-mentioned specific examples of the network may include a wireless network provided by a communication provider of the computer terminal. In one example, the transmission apparatus includes a network interface controller (NIC), which may be connected to other network devices via a base station and thus be capable of communicating with the Internet. In one example, the transceiver 105 may be a radio frequency (RF) module, which is configured to communicate with the Internet in a wireless way.

The embodiments of the present disclosure provide a method embodiment of a method for transmitting a channel state information-reference signal (CSI). It is to be noted that the steps shown in the flowcharts in the drawings may be executed in a computer system such as a set of computer executable instructions, and although logical sequences are shown in the flowcharts, the shown or described steps may be executed in sequences different from those described herein in some cases.

Figure 2:
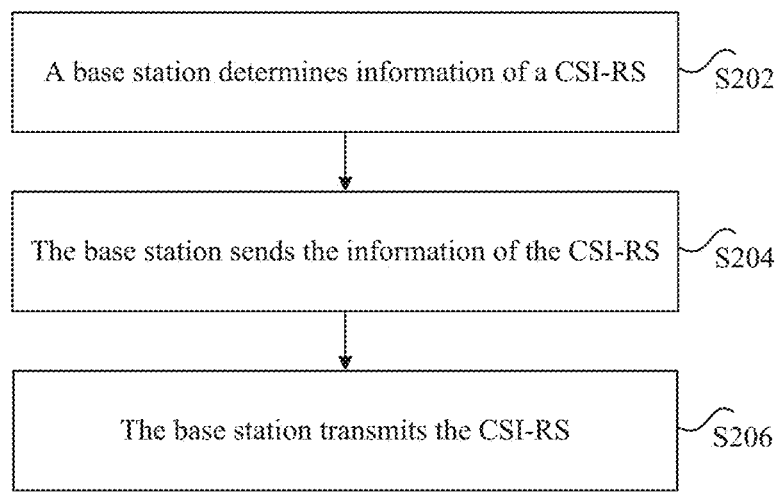
FIG. 2 is a flowchart of a method for transmitting a channel state information-reference signal according to an embodiment of the present disclosure.

FIG. 2 is a flowchart of a method for transmitting a channel state information-reference signal according to an embodiment of the present disclosure. As shown in FIG. 2, the method includes steps described below.

In step S202, a base station determines information of the CSI-RS.

The information of the CSI-RS at least includes the number of CSI-RS ports and information on components, the CSI-RS ports are used for transmitting the CSI-RS, and a CSI-RS resource is used for carrying the CSI-RS.

In step S204, the base station sends the information of the CSI-RS to a terminal.

In step S206, the base station transmits the CSI-RS.

Through the above embodiment, the base station determines the information of the CSI-RS, where the information of the CSI-RS at least includes the number of CSI-RS ports and information on components, the CSI-RS ports are used for transmitting the CSI-RS, and the CSI-RS resource is used for carrying the CSI-RS; the base station sends the information of the CSI-RS to a terminal; and the base station transmits the CSI-RS. In such a way, problems in the related art of poor channel measurement performance and high system complexity are solved, achieving technical effects of reducing system complexity and improving channel state measurement performance.

In one embodiment, the above steps may, but are not limited to, be executed by the base station.

The port represents a logic antenna, and the terminal obtains the CSI on the logic antennas by measuring a reference signal on the ports. The number of CSI-RS ports represents the number of logical antennas. A CSI-RS resource pattern is a set of resource elements (RE) for transmitting the CSI-RS (CSI-RS) and is composed of components. The component is a set of resource elements. Information on the components may include categories of the components and positions of the components.

The base station transmits the CSI-RS information. With these information, a CSI-RS resource pattern and the number of ports can be acquired. The terminal, after obtaining these information, can know which REs in which the base station measures the channel state and how many ports whose channel states are measured. The CSI-RS resource pattern is composed of components, and CSI-RS resource pattern information can be delivered through category information and position information of the components.

The number of CSI-RS ports can be a positive integer, and for example, may be 1, 2, 4, 8, 12, 16, 24, 32, etc. The categories of the components may be distinguished according to the number of contained REs, and for example, can be divided into a component containing one RE, a component containing two REs, a component containing four REs, a component containing eight REs, a component containing 12 REs, a component containing 16 REs, etc. The categories of the components may also be distinguished according to the number of components required to form the CSI-RS resource pattern, and for example, can be distinguished by using a CSI-RS resource pattern composed of one component, by using a CSI-RS resource pattern composed of two components, by using a CSI-RS resource pattern composed of three components, by using a CSI-RS resource pattern composed of four components, etc. The categories of the components may be distinguished according to the number Y of subcarriers included in the component in the frequency domain and the number Z of orthogonal frequency division multiplexing (OFDM) symbols included in the component in the time domain, and for example, can be distinguished in a following manner: (Y, Z)=(2, 1), (Y, Z)=(1, 2), (Y, Z)=(4, 1), (Y, Z)=(2, 2), (Y, Z)=(1, 4), (Y, Z)=(8, 1), (Y, Z)=(2, 4), (Y, Z)=(1, 8), (Y, Z)=(4, 2). The information on the components, for example, may be information on each component, and also may be information on one of the components or information on part of the components. The information on the components may only use a time domain position of the component, may only use a frequency domain position of the component, may simultaneously use the time domain position and the frequency domain position of the component, or may use a position of a certain RE in the component. The position may be represented by a subcarrier, may be represented by an OFDM symbol, and may be represented by a certain time unit.

In one embodiment, the information of the components includes time domain positions of the components. The step in which the base station sends the information of the CSI-RS to a terminal includes: the base station notifies the terminal of the time domain positions of the components by taking a time domain position as reference, where the reference time domain position is determined in one of following manners: the reference time domain position is the last OFDM symbol of a time slot, the reference time domain position is indicated by a category of the time slot, or the reference time domain position is configured through upper layer signaling.

In one embodiment, the components are multiple, and the step in which the base station notifies the terminal of information on multiple components includes that: the base station notifies the terminal of a selected relative positional relationship, where the base station notifies the terminal of multiple relative positional relationships among the multiple components in advance through upper layer signaling, and the selected relative positional relationship is one of the multiple relative positional relationships; the base station sends the categories of the components and the number of CSI-RS ports to the terminal, to indicate a relative positional relationship among the multiple components through the categories of the components and the number of CSI-RS ports; the base station notifies the terminal of subcarrier spacing information, to indicate a relative positional relationship among the multiple components through the subcarrier spacing information, where a subcarrier is a frequency domain unit carrying data or a signal in an OFDM system, and the subcarrier spacing information is used for indicating a spacing between the frequency domain units; the base station notifies the terminal of multiplexing manner information of the CSI-RS ports, to indicate a relative positional relationship among the multiple components through the multiplexing manner information of the CSI-RS ports, where the multiplexing manner information of the CSI-RS ports is used for indicating a wireless resource sharing manner of the ports; and the base station notifies the terminal of generation sequence information of the CSI-RS, to indicate a relative positional relationship among the multiple components through the generation sequence information of the CSI-RS, where the generation sequence information is used for indicating a generation sequence used for generating symbols of the CSI-RS.

In one embodiment, the components are multiple, and the step in which the base station notifies the terminal of information on the multiple components includes that: the base station notifies the terminal of a relative positional relationship among the multiple components through upper layer signaling, and notifies the terminal of a position of one of the multiple components through physical layer signaling; or the base station notifies the terminal of a relative positional relationship among the multiple components through physical layer signaling, and notifies the terminal of a position of one of the multiple components through upper layer signaling.

In one embodiment, the information on the components includes the time domain positions and the frequency domain positions of the components, and the step in which the base station notifies the terminal of the information on the components includes at least one of the following: the base station notifies the terminal of a time domain position of an earliest OFDM symbol of the components and a frequency domain position of a lowest-frequency subcarrier of the components; the base station notifies the terminal of a position of a latest OFDM symbol of the components on the time domain positions and a position of a highest-frequency subcarrier of the components on the frequency domain positions; or the base station notifies the terminal of a position of a latest OFDM symbol of the components on the time domain positions and a position of a lowest-frequency subcarrier of the component on the frequency domain positions.

In one embodiment, the components of the CSI-RS resource include multiple component groups, and the method further includes that: the base station notifies the terminal of multiple position information of the multiple component groups, where each position information is used for indicating a position configured for each of the multiple component groups.

In one embodiment, the position information of the component groups includes a position of a resource block in which the component groups are located and a position of a subcarrier in which the component groups are located.

In one embodiment, the information of the CSI-RS further includes frequency domain density information of the CSI-RS, and the base station indicates positions of the component groups through a following manner: the base station indicates the positions of the component groups through the frequency domain density information of the CSI-RS, where in each resource block, every K subcarriers are used for carrying one component group, where K is a position integer.

In one embodiment, upon a frequency domain density value indicated by the frequency domain density information being greater than 1, 12 can be exactly divided by the frequency domain density value, where the frequency domain density value is the number of resource elements occupied by a pattern of the CSI-RS per CSI-RS port in each resource block.

In one embodiment, the method further includes that: the base station notifies the terminal of the number of resource blocks used by a pattern represented by the multiple component groups; or the base station notifies the terminal of positions of resource blocks used by a pattern represented by the multiple component groups.

In one embodiment, the method further includes that: upon the CSI-RS being transmitted by zero power, the base station notifies multiple categories of components of the CSI-RS resource and information on each category of components.

In one embodiment, the step in which the base station notifies the terminal of information of each category of the components includes that: the base station notifies the terminal of the information of each category of the components by a bitmap manner.

In one embodiment, upon the base station notifying the terminal of information of the CSI-RS to be transmitted, the method further includes: performing joint coding by one of following manners: performing joint coding on the number of CSI-RS ports and the categories of the components; performing joint coding on positions of at least two of the components; performing joint coding on the categories of the components and the positions of the components; or performing joint coding on the number of CSI-RS ports and the positions of the components.

In one embodiment, upon the time domain position of the component notified by the base station being not in the downlink transmitting time slot, the method further includes one of the following: the base station does not transmit the CSI-RS; the base station notifies the terminal of a time window, and transmits the CSI-RS in the first downlink time slot indicated by the notified time window; or the base station notifies a transmission period of the CSI-RS, and indicates a time domain position of the CSI-RS through the number of downlink time slots included in a subframe corresponding to a configured transmission period and the number of downlink time slots of a subframe transmitting the CSI-RS.

In one embodiment, the information on the components includes frequency domain positions of the components, and the step in which the base station notifies the terminal of the frequency domain positions of the components includes that the base station selects one of multiple frequency domain positions for the components, and notifies the terminal of the frequency domain position selected for the components, where the multiple frequency domain positions are preset. In response to determining that the component occupies one subcarrier in the frequency domain, a frequency domain position of any subcarrier in a resource block is allowed to be used as the preset frequency domain position; and in response to determining the component occupies multiple subcarriers in the frequency domain, a spacing between two adjacent preset frequency domain positions in a resource block is allowed to be two subcarriers.

In one embodiment, the method further includes that: the base station notifies the terminal of a category of the CSI-RS.

One implementation mode of this embodiment is to notify the time domain positions of the components by taking a time domain position as reference. The reference time domain position is one of the following: the reference time domain position is a last OFDM symbol of a time slot, the reference time domain position is indicated by a category of the time slot, or the reference time domain position is configured through upper layer signaling.

An appropriate time domain position is selected as reference to notify the time domain position of the components, which can save signaling overhead for notifying the CSI-RS resource pattern. The time slot is a time structure unit for sending a wireless signal or data, generally including one or more OFDM symbols. One complete CSI-RS resource pattern can exist in one time slot. The first several OFDM symbols of one time slot generally are used for controlling a channel, and OFDM symbols in the middle or the latter of the time slot are used for transmitting the CSI-RS. A value describing a CSI-RS position may be within a smaller range by selecting the last OFDM symbol of the time slot as the reference, compared with using the first OFDM symbol as the reference, thereby saving signaling. Different categories of time slots have different time slot structures, and the possible positions of the CSI-RS resource pattern in the time slots are different. Therefore, the signaling overhead and the system complexity can be reduced by determining the reference time domain position according to different categories of time slots. Sometimes, the time domain position ranges in which the CSI-RS resource pattern is sent may be different according to different scenarios, and the signaling overhead can be saved when upper layer signaling configures reference time domain reference position.

In an example, the last OFDM symbol of the time slot may be an OFDM symbol before an uplink time slot in a time division duplexing (TDD) symbol, may be the last OFDM symbol of a time slot containing control signaling, may be the last OFDM symbol in a corresponding configured subcarrier spacing, may be the last OFDM symbol in a time slot of any category, and may be the last OFDM symbol of a time slot of a particular category. For a certain time slot category, the CSI-RS resource pattern is close to the third OFDM symbol of time, and the signaling overhead can be saved by taking the third OFDM symbol of this time slot as the reference position. For a certain time slot category, the CSI-RS resource pattern is close to the middlemost OFDM symbol of time, and the signaling overhead can be saved by taking the middlemost OFDM symbol of this time slot as the reference position. For a certain time slot category, the CSI-RS resource pattern is close to the last OFDM symbol of time, and the signaling overhead can be saved by taking the last OFDM symbol of this time slot as the reference position. Under the consideration of CSI-RS interference avoidance in neighbor cells, the CSI-RS resource pattern position is usually in a certain position range, and the upper layer signaling configures this position as the reference time domain position, which can save the signaling overhead. In a scenario of transmitting the CSI-RS to multiple terminals, the CSI-RS resource pattern position of a specific terminal is usually in a certain position range, and the upper layer signaling configures this position as the reference time domain position.

Another implementation mode of this embodiment is as follows: the CSI-RS resource is composed of multiple components and the base station notifies information on the multiple components.

The CSI-RS resource pattern is composed of components, and position of the multiple components can be configured, which can achieve the flexible configuration of the CSI-RS resource pattern and the pattern position. In a 5G wireless system, a subframe structure can be flexibly configurable, a transmission beam can be changed with the OFDM symbol, a data demodulation reference signal position is configurable, and data transmitted to the terminal can be scheduled in the time domain in the unit of OFDM symbol and can be scheduled in the frequency domain. In order to accommodate these features, the CSI-RS resource pattern and the pattern position require sufficient flexibility or diversity.

In an example, the CSI-RS resource with 1 port, the CSI-RS resource with 2 ports, the CSI-RS resource with 4 ports and the CSI-RS resource with 8 ports are each composed of one component, and the base station notifies a position of the one component; the CSI-RS resource with 4 ports, the CSI-RS resource with 8 ports, the CSI-RS resource with 12 ports, the CSI-RS resource with 16 ports, the CSI-RS resource with 24 ports, and the CSI-RS resource with 32 ports are each composed of multiple components, and the base station notifies information on the multiple components; the CSI-RS resource with 4 ports is composed of two components, and the base station notifies positions of the two components; the CSI-RS resource with 12 ports is composed of three components with 4 REs, and the base station notifies positions of the three components; the CSI-RS resource with 16 ports is composed of four components with 4 REs, and the base station notifies positions of the four components; and the CSI-RS resource with 16 ports is composed of two components with 8 REs, and the base station notifies positions of the two components.

Another implementation mode of this embodiment is as follows: the base station determines information on multiple components by using one of following manners: the upper layer signaling defines relative positions among the components and then notifies the terminal of a selected relative position among the components; or the relative positions among the components are determined by categories of the components and the number of ports of the CSI-RS resource.

The diversity and flexibility of the CSI-RS resource pattern can be achieved by defining or configuring multiple relative positions by the upper layer signaling. Then signaling overhead used for notifying the actually used CSI-RS resource pattern can be saved by notifying the terminal a category of the selected relative position.

The relative positions among the components are determined by categories of the components and the number of ports of the CSI-RS resource can improve the diversity and flexibility of the CSI-RS resource pattern to some extent, and can also save signaling overhead used for configuring the CSI-RS resource pattern.

In an example, the upper layer signaling defines three relative positions of two components of a CSI-RS with 4 ports, and notifies the terminal of a relative position selected for transmission; the CSI-RS resource with 8 ports is composed of two components with 2 REs, and the upper layer signaling defines three relative positions and notifies the terminal of a relative position selected for transmission; and the CSI-RS resource with 8 ports is composed of four components with 2 REs, and the upper layer signaling defines four relative positions and notifies the terminal of a relative position selected for transmission.

In another example, the CSI-RS resource with 4 ports is composed of two components with (Y, Z)=(2, 1) and corresponds to a relative component position; the CSI-RS resource with 4 ports is composed of two components with (Y, Z)=(1, 2) and corresponds to another relative component position; the CSI-RS resource with 8 ports is composed of two components with (Y, Z)=(4, 1) and corresponds to a relative component position; the CSI-RS resource with 8 ports is composed of two components with (Y, Z)=(1, 4) and corresponds to another relative component position; and the CSI-RS resource with 8 ports is composed of two components with (Y, Z)=(2, 2) and corresponds to yet another relative component position.

Another implementation mode of this embodiment is as follows: the base station notifies information on multiple components by using one of following manners: the upper layer signaling notifies the terminal of relative positions among the components and the physical layer signaling notifies starting positions of the components; or the upper layer signaling notifies the terminal of starting positions of the components and the physical layer signaling notifies the terminal of relative positions among the components.

The relative positions among the components are used for determining the CSI-RS resource pattern, and the starting positions are used for determining the position of the CSI-RS resource pattern. The upper layer signaling changes slowly while the physical layer signaling changes quickly. The upper signaling is used for notifying the relative positions among the components and the physical layer signaling is used for notifying the starting positions of the components, which can not only notify the terminal of the CSI-RS resource pattern and position, but also can reduce overhead of the physical layer signaling and flexibly configure the position of the CSI-RS resource pattern. The upper signaling is used for notifying the starting positions of the components and the physical layer signaling is used for notifying the relative positions among the components, which can not only notify the terminal of the CSI-RS resource pattern and position, but also can reduce overhead of the physical layer signaling and flexibly configure the CSI-RS resource pattern.

In an example, the CSI-RS resource with the N ports is composed of M components, and the upper layer signaling configures relative time domain positions among the M components, or the upper layer signaling configures relative frequency domain positions among the M components, or the upper layer signaling configures both time domain position and frequency domain position of the M components; and the physical layer signaling is used for notifying the starting position of the first component, or the physical layer signaling is used for notifying the starting position of the second component, or the physical layer signaling is used for notifying the starting position of the last component, or the starting position notified by the physical layer signaling is the time domain position, or the starting position notified by the physical layer signaling is the frequency domain position, or the position notified by the physical layer signaling is a joint position of the time domain and the frequency domain. N and M are positive integers.

In another example, the CSI-RS resource with N ports is composed of M components, and the upper layer signaling configures the starting position of the first component, or the upper layer signaling configures the starting position of the second component, or the upper layer signaling configures the starting position of the last component, or the starting position configured by the upper layer signaling is the time domain position, or the starting position configured by the upper layer signaling is the frequency domain position, or the position configured by the upper layer signaling is a joint position of the time domain and the frequency domain.

The physical layer signaling notifies relative time domain positions among M components, or the physical layer signaling notifies relative frequency domain positions among M components, or the physical layer signaling notifies relative time domain positions and frequency domain positions among M components. N and M are positive integers.

Another implementation mode of this embodiment is as follows: the upper layer signaling presets multiple positions of components, and then performs the indication by using one of the following manners: performing the indication by using a serial number of a position or performing the indication by using a bitmap; or the upper layer signaling presets multiple locations of components, performs the indication by using position serial numbers or bitmaps, and notifies the terminal of the pattern and location of the CSI-RS resource. Multiple possibilities of the CSI-RS resource pattern and position can be provided by presetting multiple positions, combining with the indication can provide flexibility of selection, and combining with position serial number indication or the bitmap can save the signaling overhead.

In an example, the upper layer signaling presets L positions in the time domain, or presets Q positions in the frequency domain, or presets R joint positions in the time domain and the frequency domain. Different positions correspond to different serial numbers and are indicated by using different bit combination states; or different positions correspond to one indication bit and one bit indicates one position; one position is indicated and a position of one component is notified, so as to indicate the position of the whole CSI-RS resource pattern; and multiple positions are indicated and positions of multiple components are notified, so as to indicate the pattern and position of the CSI-RS resource.

Another implementation mode of this embodiment is as follows. The base station notifies positions of components by using following manners: the time domain position is used for notifying the position of the earliest OFDM in which the components are located, and the frequency domain position is used for notifying the position of the lowest-frequency subcarrier in which the components are located; or the time domain position is used for notifying the position of the last OFDM in which the components are located, and the frequency domain position is used for notifying the position of the lowest-frequency subcarrier in which the components are located; and the components are composed of multiple REs, and a position of a RE with the earliest time domain position and the lowest frequency domain position is taken as the position of the component for notification, or a position of a RE with the last time domain position and the lowest frequency domain position is taken as the position of the component for notification. The lowest position of the components in the frequency domain and the number of subcarriers occupied by the components in the frequency domain can be used to obtain the highest position of the components in the frequency domain by using addition calculation. Since the complexity of the addition calculation is low, an effect of reducing calculation complexity can be achieved. Upon the position of the earliest RE of the CSI-RS resource pattern being closer to the reference time domain position than the position of the last RE, the time domain position notifies the earliest RE position of the components, so that a difference value between the time position of the component and the reference time domain position can be reduced, so as to reduce the signaling overhead. Similarly, upon the position of the last RE of the CSI-RS resource pattern being closer to the reference time domain position than the position of the earliest RE, the time domain position notifies the last RE of the components, so that the difference between the time position of the component and the reference time domain position can be reduced, so as to reduce the signaling overhead.

In an example, for a component with (Y, Z)=(4, 1), the position of the lowest-frequency RE is notified; for a component with (Y, Z)=(4, 2), the position of the lowest-frequency and the earliest RE is notified; for a component with (Y, Z)=(2, 4), the position of the lowest-frequency and the earliest RE is notified; for a component with (Y, Z)=(2, 1), the position of the lowest-frequency RE is notified; for a component with (Y, Z)=(42, 2), the position of the lowest-frequency and the last RE is notified; and for a component with (Y, Z)=(2, 2), the position of the lowest-frequency and the last RE is notified.

Another implementation mode of this embodiment is as follows: the base station notifies multiple positions of a component group. The base station notifies the multiple positions of the component group, which can form flexible and diversified density patterns between component groups, meet the requirement of the CSI-RS resource density change, and can also coexist with other variable reference signals, coexist with other variable control channels, coexist with other variable data channels and coexist with variable time slot structures. In the present application, the CSI-RS resource density in the frequency domain may be configured to be lower than one RE in each resource block (RB) on each port, may be configured to be higher than one RE in each RB on each port, and may also be configured to be one RE in each RB on each port. In the present application, multiple beams may also be measured in different time domain positions. That is, the present application provides power for scanning the beams. Upon the demodulation reference signal being changed in different RB patterns or is changed in different time domain units, the CSI-RS resource provided by the present application can coexist with the demodulation reference signal. Upon the phase tracking the reference signal being changed in different RB patterns, the CSI-RS resource provided by the present application can coexist with the phase tracking the reference signal. Upon the patterns of other control channels and data channels in the frequency domain or in the time domain being changed, the CSI-RS resource provided by the present application can coexist with the patterns.

In an example, the base station notifies M positions of the component groups, where M is a positive integer. The base station may use one parameter to notify the M positions, and this parameter may be a spacing between component groups, may be a spacing in the frequency domain, and may also be a spacing in the frequency domain. The base station may use two parameters to notify the M positions, where one parameter is a position of a certain component group that may be a starting component group, may be an ending component group, and may also be a component group with a certain fixed serial number, and the other parameter is a spacing between component groups. The base station may use two groups of parameters to notify the M positions, where one group of parameters is positions of a certain component group that may be a starting component group, may be an ending component group, and may also be a component group with a certain fixed serial number, and the other group of parameters is relative positions between component groups. The base station may also use M parameters or M groups of parameters to respectively notify the M positions. In another example, the number M of component group positions may be notified or indicated by the base station; or the number M of component group positions may be pre-determined.

Another implementation mode of this embodiment is as follows: position information on component groups notified by the base station includes positions of RBs in which component groups are located and positions of subcarriers.

The subcarrier is the minimum unit of the frequency domain, and the RB is composed of multiple subcarriers. The base station notifies the positions of the component groups through two groups of frequency domain units. The specific positions of the component groups may be clearly notified within a specified range, and the signaling overhead may also be saved.

In an example, the base station notifies that the component group is in the M0-th RB and the N0-th subcarrier; or the base station notifies that the component group offsets by M0 RBS and offsets by N0 subcarriers; or the base station notifies that the component group is in the M0-th RB and offsets from the N0-th subcarrier; or the base station notifies that the component group offsets by M0 RBs and in the N0-th subcarrier. In another example, the component group takes a position of a component group of a previous serial number as reference and offsets by M0 RBs; or the k-th component group takes the k-th RB as reference and offsets by M0 RBs; or the component group offsets by M0 RBs from a pre-determined reference position.

In another example, the component group takes a position of a component group of a previous serial number as reference and offsets by N0 subcarriers; or the component group offsets by M0 subcarriers from a pre-determined reference position. In another example, the component group offsets by reference to a position of the component group upon each port having one RE in each RB. In another example, the component group offsets in units of the number of subcarriers occupied by the component group; or the component group offsets in units of the number of REs occupied by the component group. In another example, each component group offsets by using the same parameter; or each component group offsets by using an independent parameter; or each component group performs RB offset using the same parameter; or each component group performs subcarrier offset using the same parameter. In another example, joint coding is performed on an RB position parameter and a subcarrier position parameter of the component group. M0, N0 and k are integers.

Another implementation mode of this embodiment is as follows: the information of the CSI-RS further includes frequency domain density information of the CSI-RS, and the base station indicates the positions of the component groups through the following manner.

The base station indicates the positions of the component groups through the frequency domain density information of the CSI-RS, where in each RB, every K subcarriers are used for carrying one component group, where K is a position integer.

Each K subcarriers contain one component group, which can provide a CSI-RS with a density greater than 1 RE/RB/port, thereby improving channel estimation precise to support wireless transmission with a subcarrier spacing greater than 15 kHz. K is indicated by the frequency domain density information of the reference signal to control a frequency density of the reference signal, thereby controlling the quality of channel estimation using the reference signal.

In an example, each K subcarriers contain one component group, and the pattern of each component carrier is the same; or each K subcarriers contain one component group, and the pattern of each component carrier is respectively independent of each other. In another example, a value of K is 1, each subcarrier has one component group, and each RB has 12 component groups; a value of K is 2, each two subcarriers have one component group, and each RB has six component groups; a value of K is 3, each three subcarriers has one component group, and each RB has six component groups; a value of K is 4, each four subcarriers have one component group, and each RB has three component groups; a value of K is 6, each six subcarriers have one component group, and each RB has two component groups; and a value of K is 12, each 12 subcarriers have one component group, and each RB has one component group. In an example, the frequency domain density of the reference signal is 1 RE/RB/port, indicating the value of K is 12; or the frequency domain density of the reference signal is 2 RE/RB/port, indicating the value of K is 6; or the frequency domain density of the reference signal is 3 RE/RB/port, indicating the value of K is 4; or the frequency domain density of the reference signal is 4 RE/RB/port, indicating the value of K is 3; or the frequency domain density of the reference signal is 6 RE/RB/port, indicating the value of K is 2; or the frequency domain density of the reference signal is 12 RE/RB/port, indicating the value of K is 1.

Another implementation mode of this embodiment is as follows: upon a frequency domain density value indicated by the frequency domain density information being greater than 1, 12 can be exactly divided by the frequency domain density value, where the frequency domain density value is the number of resource elements occupied by the pattern of the CSI-RS in each resource block on each port.

The frequency domain density value is a positive integer, by which 12 can be exactly divided, which can provide a function of one component group per an integer number of subcarriers, so as to provide the same reference signal density for each segment of frequency domain, thereby providing the same channel estimation performance at the position of each segment of frequency domain.

In an example, the frequency domain density value is 2, and each six subcarriers have one component group; or the frequency domain density value is 3, and each four subcarriers have one component group; or the frequency domain density value is 4, and each three subcarriers have one component group; or the frequency domain density value is 6, and each two subcarriers have one component group; or the frequency domain density value is 12, and each one subcarrier has one component group.

Another implementation mode of this embodiment is as follows: the spacing between component groups in the frequency domain is equal.

The equal spacing between component groups in the frequency domain can not only generate different frequency domain densities, but also enable components in the same component group more tightly. At the same time, it reduces transmission complexity and receiving complexity of the CSI-RS and saves the signaling overhead.

In an example, the equal spacing between component groups is in units of RBs, or the equal spacing between component groups is in units of subcarriers, or the equal spacing between component groups is in units of the number of subcarriers occupied by component groups, or the equal spacing between component groups is in units of subcarriers spanned by component groups. In an example, after subcarriers occupied by other signals are excluded, the spacing between component groups is equal; or, after subcarriers occupied by other channels are excluded, the spacing between component groups is equal; or the spacing between component groups is equal in preset subcarriers; or the spacing between component groups is equal in pre-notified subcarriers.

Another implementation mode of this embodiment is as follows: the base station notifies the number of RBs used by multiple component group patterns; or the base station notifies the terminal of positions of RBs used by a pattern represented by multiple component groups.

The base station notifies that the number of RBs occupied by multiple component group patterns is M1. The component groups have a certain relative position and form a pattern between component groups. This pattern between the component groups is repeated in units of M1 RBs under the bandwidth transmitted by the CSI-RS resource. The present application provides the relative position pattern between multiple component groups within a frequency domain range in units of M1 RBs, which meets the requirement of the system for the diversity and flexibility of the pattern position, and at the same time, reduces the system complexity and saves the signaling overhead. The relative position pattern between component groups contains the density between component groups, thus containing the CSI-RS resource density. M1 is a positive integer.

The base station indicates positions of RBs used by the pattern represented by multiple component groups, so as to indicate the frequency domain position in which the CSI-RS is transmitted, thereby indicating the frequency domain position in which the channel state needs to be estimated.

In an example, patterns of multiple component groups are on M1 RBs, and the component groups may be equally spaced or not equally spaced. The quantity N1 of component groups may be less than M1, may be greater than M1, and may also be equal to M1. The number M1 of RBs used by multiple component group patterns may be indicated by a denominator of the CSI-RS resource density; or the number M1 of RBs used by multiple component group patterns is directly indicated; or the number of component groups and the number of RBs used by multiple component group patterns are jointly coded, which can save the signaling overhead. Alternatively, the number of RBs used by multiple component group patterns is indicated using another frequency domain unit, such as an integral multiple of subcarriers, an integral multiple of RBs, an integral multiple of subcarriers occupied by component groups, or an integral multiple of subcarriers spanned by component groups.

In an example, the base station indicates that RBs used by the pattern represented by multiple component groups are continuous or are not continuous; or performs the indication in units of groups formed by multiple RBs.

Another implementation mode of this embodiment is as follows: for the CSI-RS of zero power, the base station notifies multiple categories of components of the CSI-RS resource and positions of each category of components.

The CSI-RS is transmitted by using zero power. The CSI-RS resource transmitted using zero power is composed of multiple categories of components, and multiple types of zero-power CSI-RS resource patterns can be formed, achieving the requirement for flexibility and saving the signaling overhead. The base station notifies the position of each category of components to form an accurate zero-power CSI-RS resource pattern and position.

In an example, the categories of components of the CSI-RS resource notified by the base station may be categories divided based on the number of REs, and may be categories divided based on component patterns, such as (Y, Z) array, where Y is the number of frequency domain subcarriers occupied by components, and Z is the number of time domain elements occupied by components; and the base station may also notify categories divided based on component groups. Positions of different categories of components are notified by using different levels of signalings; or positions of different categories of components are notified by using the same level of signaling; or different categories of components performs the notification by using the same manners; or different categories of components performs the notification by using different manners; or positions of different categories of components are separately notified; or positions of different categories of components are jointly notified. Alternatively, positions of components are pre-defined or configured, and then the component position used for transmitting the zero-power CSI-RS resource pattern is indicated; or the component position used for transmitting the zero-power CSI-RS resource pattern is configured; or part of the component position used for transmitting the zero-power CSI-RS resource pattern is configured, and then the remaining part of the component position is indicated.

Another implementation mode of this embodiment is as follows: the base station notifies positions of multiple categories of components using the bitmap manner.

The base station uses one bit to represent a position of one component, uses one state of the bit to indicate that a corresponding position is used, and uses another state of the bit to indicate that the corresponding position is not used; the base station indicates both positions of multiple categories of components of the zero-power transmitted CSI-RS resource using the bitmap manner. The solution can provide flexibility of the CSI-RS resource pattern and position, and at the same time reduce the system complexity and save the signaling overhead.

In an example, each category of components of the zero-power CSI-RS resource independently corresponds to a group of bits in the bitmap; or all categories of components of the zero-power CSI-RS resource correspond to a group of bits in the bitmap. Alternatively, the length of the used bit group may be configured; or the length of the used bit group is preset by a protocol. Alternatively, the number of the used bit groups may be configured; or the number of the used bit groups is preset by the protocol. Alternatively, the used categories of components correspond to a group of bits, and each category of components respectively uses bits in different intervals of the bit group, i.e., a bit field; or the length of the bit field used by each category of components can be configured; or the length of each bit field is separately configured; or the length of each bit field is jointly configured; or the length of each bit filed is preset by the protocol; or the length of each bit filed is the same; or the number of bit fields can be configured; or the number of bit fields are preset by the protocol. Alternatively, a possible position range of components of the zero-power CSI-RS resource pattern is pre-selected and set by the protocol, and then the component position used by the zero-power CSI-RS resource patter is indicated by the bitmap; or possible position range of components of the zero-power CSI-RS resource pattern is pre-configured, and then the component position used by the zero-power CSI-RS resource patter is indicated by the bitmap; or part of the component position of the zero-power CSI-RS resource pattern is pre-configured, and then the remaining part of the component position of the zero-power CSI-RS resource pattern is indicated by the bitmap; or a bit position of the zero-power CSI-RS resource pattern is pre-configured, and then the modification of whether to use part of the component position is indicated by the bitmap.

Another implementation mode of this embodiment is to perform joint coding by using one of following manners: performing joint coding on the number of CSI-RS ports and the categories of the components; performing joint coding on positions of the components; performing joint coding on the categories of the components and the positions of the components; or performing joint coding on the number of CSI-RS ports and the positions of the components.

The categories of components possibly used by CSI-RS resources with different numbers of CSI-RS ports are independent. That is, a certain number of CSI-RS ports is related to the corresponding possible category of components, so that performing joint coding on the number of CSI-RS ports and the categories of the components can save the signaling overhead. Positions of a group of components forming the specific resource pattern are related, so that performing joint coding on the positions of the components can save the signaling overhead; the categories of the components are related to the positions of the components, so that performing joint coding on the categories of the components and the positions of the components can save the signaling overhead; and the number of CSI-RS ports is related to positions of corresponding components, so that performing joint coding on the number of CSI-RS ports and the positions of the components can save the signaling overhead.

In an example, the number of CSI-RS ports is M2, the categories of the components are N2, the number of CSI-RS ports and the categories of the components have L2 combination states, and the number of CSI-RS ports and the categories of the components corresponding to the CSI-RS resource are indicated by using X2 serial numbers or states, or X2=L2, or L2<X2<M3*N2, where * denotes the multiplication operation.

Another implementation mode of this embodiment is as follows: upon the time domain position of the component notified by the base station being not in the downlink transmitting time slot, the method further includes one of the following steps: the base station does not transmit the CSI-RS; the base station notifies the terminal of a time window, and transmits the CSI-RS in the first downlink time slot indicated by the notified time window; or the base station notifies a transmission period of the CSI-RS, and indicates a time domain position of the CSI-RS through the number of downlink time slots contained in a configured radio frame corresponding to the transmission period and the number of downlink time slots of a radio frame transmitting the CSI-RS.

The CSI-RS is not sent, which provides an error avoidance mechanism. The base station notifies a time window and sends the CSI-RS in the first downlink time slot indicated by the notified time window, which provides a retransmission opportunity which approaches the time when the reference signal should be sent in terms of time. The base station further notifies the transmission period of the CSI-RS, and indicates the time domain position of the CSI-RS through the number of downlink time slots contained in the configured radio frame corresponding to the transmission period and the number of downlink time slots of the radio frame transmitting the CSI-RS, which provides a retransmission opportunity and reduces burden of a time slot responsible for the retransmission opportunity.

In an example, the reference signal is configured to be sent in T+S time slots, and the radio frame for transmitting data only has T downlink time slots, so the base station does not send the reference signal in the T+S time slot, where S is greater than T, or S is equal to T, or S is less than T.

In another example, the base station further configures a time window U for the terminal, where the time window U is greater than S, and the reference signal is sent in the first downlink time slot during a period from T+S to T+U, where U is greater than T, or U is equal to T, or U is less than T.

In another example, the number of downlink time slots contained in the configured radio frame corresponding to the transmission period is A, the number of downlink time slots contained in the radio frame transmitting the CSI-RS is B, and the configured sending time slot is the (S+T)-th time slot, so the actual transmitting time slot is mod(S+T, B), where mod( ) is the modulation operation.

Another implementation mode of this embodiment is as follows: the information of the components includes frequency domain positions of the components, and the step in which the base station notifies the terminal of the frequency domain positions of the components is as follows. The base station selects one of multiple frequency domain positions for the components, and notifies the terminal of the frequency domain position selected for the components, where the multiple frequency domain positions are preset. In response to determining that the component occupies one subcarrier in the frequency domain, a frequency domain position of any subcarrier in a resource block is allowed to be used as the preset frequency domain position. In response to determining that the component occupies multiple subcarriers in the frequency domain, a spacing between two adjacent preset frequency domain positions in a resource block is allowed to be two subcarriers.

Upon the size of the component in the frequency domain being one subframe, the position of each subframe in the resource block is a preset position, which can provide a position with the minimum precise of one subcarrier for the component with the size of one subcarrier. Upon the size of the component in the frequency domain being larger than one subcarrier, a spacing between two adjacent preset positions is allowed to be two subcarrier, which can provide more optional positions for larger components and can also avoid the waste when the preset position is any position.

In an example, the component whose size is one subcarrier in the frequency domain may be (Y, Q)=(1, 2) or (Y, Q)=(1, 4); the size of the resource block may be V, that is, the resource block contains V subcarriers, where V may be 12 or 24; and the position of each subcarrier in the resource block is the preset position. The component whose size is larger than one subcarrier in the frequency domain may be (Y, Q)=(2, 1), or (Y, Q)=(2, 4), or (Y, Q)=(4, 1), or (Y, Q)=(8, 1). The preset positions may be the zeroth subcarrier, the second subcarrier, the fourth subcarrier, the sixth subcarrier, the eighth subcarrier and the tenth subcarrier, or may be the zeroth subcarrier and the second subcarrier, or may be the zeroth subcarrier, the second subcarrier and the fourth subcarrier, or may be the zeroth subcarrier, the second subcarrier, the fourth subcarrier and the sixth subcarrier, or may be the fourth subcarrier, the sixth subcarrier and the eighth subcarrier.

Another implementation mode of this embodiment is as follows: the base station notifies the category of the CSI-RS.

Upon the categories of the CSI-RS being different, the functions of the CSI-RS are different, or the composition manners of the CSI-RS resource pattern are different, or the positions of the CSI-RS resource pattern are also different. Notifying the information on the category of the CSI-RS can save overhead of the CSI-RS resource pattern and position signaling and reduce the system complexity.

In an example, the category of the CSI-RS is a category for acquiring the channel state, or the category of the CSI-RS is a category for beam scanning, or the category of the CSI-RS is a category for mobile management, or the category of the CSI-RS is a category for phase tracking.

From the description of the embodiments described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the technical solution of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 2

The embodiments of the present disclosure further provide a device for transmitting a CSI-RS. The device is used for implementing the above-mentioned embodiments and preferred embodiments. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 3:
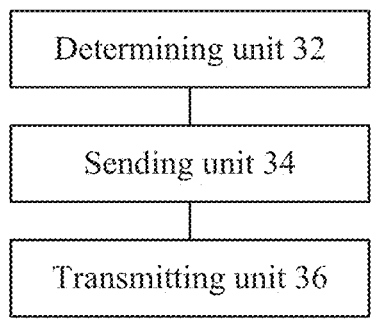
FIG. 3 is a schematic diagram of a device for transmitting a channel state information-reference signal according to an embodiment of the present disclosure.

FIG. 3 is a schematic diagram of a device for transmitting a channel state information-reference signal according to this embodiment of the present disclosure. As shown in FIG. 3, the device may include a determining unit 32, a sending unit 34 and a transmitting unit 36.

The determining unit 32 is configured to determine information of the CSI-RS.

The information of the CSI-RS at least includes the number of CSI-RS ports and information on components, the CSI-RS ports are configured to transmit the CSI-RS, and a CSI-RS resource is used for carrying the CSI-RS.

The sending unit 34 is configured to send the information of the CSI-RS to a terminal.

The transmitting unit 36 is configured to transmit the CSI-RS.

Through the above embodiment, the determining unit determines the information of the CSI-RS, where the information of the CSI-RS at least includes the number of CSI-RS ports, categories of components of a CSI-RS resource and information of components, the CSI-RS ports are configured to transmit the CSI-RS, and the CSI-RS resource is used for carrying the CSI-RS; the sending unit sends the information of the CSI-RS to the terminal; and the transmitting unit transmits the CSI-RS. In such a way, problems in the related art of poor channel measurement performance and high system complexity are solved, achieving technical effects of reducing system complexity and improving channel state measurement performance.

In one embodiment, the information of the components includes time domain positions of the components. The sending unit is further configured to notify the terminal of the time domain positions of the components by taking a time domain position as reference. The reference time domain position is determined in one of following manners: the reference time domain position is the last OFDM symbol of a time slot, the reference time domain position is indicated by a category of the time slot, or the reference time domain position is configured through upper layer signaling.

In one embodiment, the CSI-RS resource includes multiple components, and the sending unit includes a first notifying module, a second notifying module, a third notifying module, a fourth notifying module and a fifth notifying module. The first notifying module is configured to notify the terminal of a selected relative positional relationship, where a base station notifies the terminal of multiple relative positional relationships among the multiple components in advance through upper layer signaling, and the selected relative positional relationship is one of the multiple relative positional relationships. The second notifying module is configured to send the categories of the components and the number of CSI-RS ports to the terminal, to indicate a relative positional relationship among the multiple components through the categories of the components and the number of CSI-RS ports. The third notifying module is configured to notify the terminal of subcarrier spacing information, to indicate a relative positional relationship among the multiple components through the subcarrier spacing information, where a subcarrier is a frequency domain unit for carrying data or a signal in an OFDM system, and the subcarrier spacing information is used for indicating a spacing between the frequency domain units. The fourth notifying module is configured to notify the terminal of multiplexing manner information of the CSI-RS ports, to indicate a relative positional relationship among the multiple components through the multiplexing manner information of the CSI-RS ports, where the multiplexing manner information of the CSI-RS ports is used for indicating a wireless resource sharing manner of the ports. The fifth notifying module is configured to notify the terminal of generation sequence information of the CSI-RS, to indicate a relative positional relationship among the multiple components through the generation sequence information of the CSI-RS, where the generation sequence information is used for indicating a generation sequence used for generating symbols of the CSI-RS.

In one embodiment, the CSI-RS resource includes multiple components, and the sending unit includes a sixth notifying module and a seventh notifying module. The sixth notifying module is configured to notify the terminal of a relative positional relationship among the multiple components through upper layer signaling, and notify the terminal of a position of one of the multiple components through physical layer signaling. The seventh notifying module is configured to notify the terminal of a relative positional relationship among the multiple components through physical layer signaling, and notify the terminal of a position of one of the multiple components through upper layer signaling.

In one embodiment, the information of the components includes the time domain positions and the frequency domain positions of the components, and the sending unit includes a ninth notifying module, a tenth notifying module and an eleventh notifying module. The ninth notifying module is configured to notify the terminal of a position of an earliest OFDM symbol of the components on the time domain positions and a position of a lowest-frequency subcarrier of the components on the frequency domain positions. The tenth notifying module is configured to notify the terminal of a position of a latest OFDM symbol of the components on the time domain positions and a position of a highest-frequency subcarrier of the components on the frequency domain positions. The eleventh notifying module is configured to notify the terminal of a position of a latest OFDM symbol of the components on the time domain positions and a position of a lowest-frequency subcarrier of the components on the frequency domain positions.

In one embodiment, the components of the CSI-RS resource include multiple component groups, and the sending unit includes a twelfth notifying module. The twelfth notifying module is configured to notify the terminal of multiple pieces of position information of the multiple component groups, where each position information is used for indicating a position configured for each of the multiple component groups.

In one embodiment, the position information of the component group includes a position of a resource block in which the component group is located and a position of a subcarrier in which the component group is located.

In one embodiment, the information of the CSI-RS further includes frequency domain density information of the CSI-RS, and the sending unit is further configured to indicate positions of the component groups through the frequency domain density information of the CSI-RS, where in each resource block, every K subcarriers are used for carrying one component group, where K is a position integer.

In one embodiment, upon a frequency domain density value indicated by the frequency domain density information being greater than 1, 12 can be exactly divided by the frequency domain density value, where the frequency domain density value is the number of resource elements occupied by a pattern of the CSI-RS per CSI-RS port in each resource block.

In one embodiment, the device further includes a first notifying unit and a second notifying unit. The first notifying unit is configured to notify the terminal of the number of resource blocks used by a pattern represented by the multiple component groups. The second notifying unit is configured to notify the terminal of positions of resource blocks used by a pattern represented by the multiple component groups.

In one embodiment, the device further includes a third notifying unit. The third notifying unit is configured to, upon the CSI-RS being transmitted by zero power, notify the terminal of multiple categories of components of the CSI-RS resource and information of each category of the components.

In one embodiment, the third notifying unit is further configured to notify the terminal of the information on each category of the components by a bitmap manner.

In one embodiment, upon the sending unit sending the information of the CSI-RS to the terminal, the sending unit performs joint coding by one of following manners: performing joint coding on the number of CSI-RS ports and the categories of the components; performing joint coding on positions of at least two of the components; performing joint coding on the categories of the components and the positions of the components; or performing joint coding on the number of CSI-RS ports and the positions of the components.

In one embodiment, upon the time domain position of the component notified by the sending unit being not in the downlink transmitting time slot, the device further includes a controlling unit, a fourth notifying unit and a fifth notifying unit. The controlling unit is configured to control the sending unit not to transmit the CSI-RS. The fourth notifying unit is configured to notify the terminal of a time window, and transmit the CSI-RS in a first downlink time slot indicated by the notified time window. The fifth notifying unit is configured to notify the terminal of a transmission period of the CSI-RS, and indicate a time domain position of the CSI-RS through the number of downlink time slots contained in a configured radio frame corresponding to the transmission period and the number of downlink time slots contained in a radio frame transmitting the CSI-RS.

In one embodiment, the information of the components includes frequency domain positions of the components, and the sending unit includes a selecting module. The selecting module is configured to select one of multiple frequency domain positions for the components, and notify the terminal of the frequency domain position selected for the components, where the multiple frequency domain positions are preset. In response to determining that the component occupies one subcarrier in the frequency domain, a frequency domain position of any subcarrier in a resource block is allowed to be used as the preset frequency domain position; and in response to determining that the component occupies multiple subcarriers in the frequency domain, a spacing between two adjacent preset frequency domain positions in a resource block is allowed to be two subcarriers.

In one embodiment, the device further includes a sixth notifying unit. The sixth notifying unit is configured to notify the terminal of a category of the CSI-RS.

It is to be noted that the various modules described above may be implemented by software or hardware. Implementation by hardware may, but may not necessarily, be performed in the following manners: the various modules described above are located in the same processor, or the various modules described above are located in their respective processors in any combination form.

Embodiment 3

The embodiments of the present disclosure further provide a storage medium. In this embodiment, the storage medium may be configured to store program codes for executing the steps described below.

In S11, information of the CSI-RS is determined.

The information of the CSI-RS at least includes the number of CSI-RS ports, categories of components of a CSI-RS resource and information of components. The CSI-RS ports are configured to transmit a CSI-RS, and the CSI-RS resource is used for carrying the CSI-RS.

In S12, the information of the CSI-RS is sent to a terminal.

In S13, the CSI-RS is transmitted.

In one embodiment, the storage medium is further configured to store program codes for executing the steps described below.

In S21, a base station notifies the terminal of a selected relative positional relationship. The base station notifies the terminal of multiple relative positional relationships of the multiple components in advance through upper layer signaling, and the selected relative positional relationship is one of the multiple relative positional relationships.

In S22, the base station sends the categories of the components and the number of CSI-RS ports to the terminal, to indicate a relative positional relationship among the multiple components through the categories of the components and the number of CSI-RS ports.

In S23, the base station notifies the terminal of subcarrier spacing information, to indicate a relative positional relationship among the multiple components through the subcarrier spacing information, where a subcarrier is a frequency domain unit carrying data or a signal in an OFDM system, and the subcarrier spacing information is used for indicating a spacing between the frequency domain units.

In S24, the base station notifies the terminal of multiplexing manner information of the CSI-RS ports, to indicate a relative positional relationship among the multiple components through the multiplexing manner information of the CSI-RS ports, where the multiplexing manner information of the CSI-RS ports is used for indicating a wireless resource sharing manner between the ports.

In S24, the base station notifies the terminal of generation sequence information of the CSI-RS, to indicate a relative positional relationship among the multiple components through the generation sequence information of the CSI-RS, where the generation sequence information is used for indicating a generation sequence used for generating symbols of the CSI-RS.

In this embodiment, the storage medium may include, but is not limited to, a USB flash disk, a read-only memory (ROM), a random access memory (RAM), a mobile hard disk, a magnetic disk, an optical disk or another medium capable of storing the program codes.

In this embodiment, a processor, according to the program coded stored in the storage medium, executes following steps. The base station determines information of the CSI-RS, where the information of the CSI-RS at least includes the number of CSI-RS ports, categories of components of a CSI-RS resource, and information of components. The CSI-RS ports are configured to transmit the CSI-RS, and the CSI-RS resource is used for carrying the CSI-RS; the base station sends the information of the CSI-RS to a terminal; and the base station transmits the CSI-RS.

In one embodiment, the processor, according to the program coded stored in the storage medium, executes following steps. The base station notifies the terminal of a selected relative positional relationship, where the base station notifies the terminal of multiple relative positional relationships among the multiple components in advance through upper layer signaling, and the selected relative positional relationship is one of the multiple relative positional relationships. The base station sends the categories of the components and the number of CSI-RS ports to the terminal, to indicate a relative positional relationship of the multiple components through the categories of the components and the number of CSI-RS ports. The base station notifies the terminal of subcarrier spacing information, to indicate a relative positional relationship of the multiple components through the subcarrier spacing information, where a subcarrier is a frequency domain unit carrying data or a signal in an OFDM system, and the subcarrier spacing information is used for indicating a spacing between the frequency domain units. The base station notifies the terminal of multiplexing manner information of the CSI-RS ports, to indicate a relative positional relationship of the multiple components through the multiplexing manner information of the CSI-RS ports, where the multiplexing manner information of the CSI-RS ports is used for indicating a wireless resource sharing manner of the ports. The base station notifies the terminal of generation sequence information of the CSI-RS, to indicate a relative positional relationship of the multiple components through the generation sequence information of the CSI-RS, where the generation sequence information is used for indicating a generation sequence used for generating symbols of the CSI-RS.

For specific examples in this embodiment, reference may be made to the examples described in the above-mentioned embodiments and optional implementation modes, and repetition will not be made in this embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

In the embodiments of the present disclosure, a base station determines information of the CSI-RS, where the information of the CSI-RS at least includes the number of CSI-RS ports and information of components of a CSI-RS resource, the CSI-RS ports are used for transmitting the CSI-RS, and the CSI-RS resource is used for carrying the CSI-RS; the base station sends the information of the CSI-RS to a terminal; and the base station transmits the CSI-RS. In such a way, problems in the related art of poor channel measurement performance and high system complexity are solved, achieving technical effects of reducing system complexity and improving channel state measurement performance.

What is claimed is:

1. A method for transmitting a channel state information-reference signal (CSI-RS), comprising:
   determining, by a base station, information of the CSI-RS, wherein the information of the CSI-RS at least comprises a number of CSI-RS ports and information of components of a CSI-RS resource, wherein the CSI-RS ports are used for transmitting the CSI-RS, and the CSI-RS resource is used for carrying the CSI-RS;
   transmitting, by the base station, the information of the CSI-RS to a terminal; and
   transmitting, by the base station, the CSI-RS;
   wherein the information of the components comprises time domain positions and frequency domain positions of the components, and notifying, by the base station, the terminal of the information of the components comprises at least one of the following:
   notifying, by the base station, the terminal of a position of an earliest orthogonal frequency division multiplexing (OFDM) symbol of the components on the time domain positions and a position of a lowest-frequency subcarrier of the components on the frequency domain positions;
   notifying by the base station, the terminal of a position of a latest OFDM symbol of the components on the time domain positions and a position of a highest-frequency subcarrier of the components on the frequency domain positions, or
   notifying, by the base station, the terminal of a position of a latest OFDM symbol of the components on the time domain positions and a position of a lowest-frequency subcarrier of the components on the frequency domain positions.

2. The method of claim 1, wherein the information of the components comprises time domain positions of the components, and transmitting, by the base station, the information of the CSI-RS to the terminal comprises:
   notifying, by the base station, the terminal of the time domain positions of the components by taking a time domain position as reference;
   wherein the reference time domain position is determined in one of following manners: the reference time domain position is a last OFDM symbol of a time slot, the reference time domain position is indicated by a category of the time slot, or the reference time domain position is configured through upper layer signaling.

3. The method of claim 1, wherein the components are a plurality, the information of the components comprises categories of the components and positions of the components, and notifying, by the base station, the terminal of the information of the plurality of components comprises at least one of the following:
   notifying, by the base station, the terminal of a selected relative positional relationship, wherein the base station notifies the terminal of a plurality of relative positional relationships of the plurality of components in advance through upper layer signaling, and the selected relative positional relationship is one of the plurality of relative positional relationships;
   sending, by the base station, the categories of the components and the number of CSI-RS ports to the terminal to indicate a relative positional relationship of the plurality of components through the categories of the components and the number of CSI-RS ports;
   notifying, by the base station, the terminal of subcarrier spacing information to indicate a relative positional relationship of the plurality of components through the subcarrier spacing information, wherein a subcarrier is a frequency domain unit carrying data or a signal in an OFDM system, and the subcarrier spacing information is used for indicating a spacing between the frequency domain units;
   notifying, by the base station, the terminal of multiplexing manner information of the CSI-RS ports to indicate a relative positional relationship of the plurality of components through the multiplexing manner information of the CSI-RS ports, wherein the multiplexing manner information of the CSI-RS ports is used for indicating a wireless resource sharing manner of the CSI-RS ports; or
   notifying, by the base station, the terminal of generation sequence information of the CSI-RS to indicate a relative positional relationship of the plurality of components through the generation sequence information of the CSI-RS, wherein the generation sequence information is used for indicating a generation sequence used for generating symbols of the CSI-RS.

4. The method of claim 1, wherein the components are a plurality, and notifying, by the base station, the terminal of information of the plurality of components comprises:
   notifying, by the base station, the terminal of a relative positional relationship of the plurality of components through upper layer signaling, and notifying the terminal of a position of one of the plurality of components through physical layer signaling; or
   notifying, by the base station, the terminal of a relative positional relationship of the plurality of components through physical layer signaling, and notifying the terminal of a position of one of the plurality of components through upper layer signaling.

5. A non-transitory storage medium, storing programs, wherein the programs, when executed, execute the method for transmitting a CSI-RS of claim 1.

6. The method of claim 1, wherein the components of the CSI-RS resource comprise a plurality of component groups, and the method further comprises:
   notifying, by the base station, the terminal of a plurality of position information of the plurality of component groups, wherein each of the plurality of position information is used for indicating a position configured for each of the plurality of component groups.

7. The method of claim 6, wherein the position information of the component group comprises a position of a resource block in which the component group is located and a position of a subcarrier in which the component group is located.

8. The method of claim 6, wherein the information of the CSI-RS further comprises frequency domain density information of the CSI-RS, and the base station indicates position of the component group through the following manner:

the base station indicates the position of the component group through the frequency domain density information of the CSI-RS, wherein in each resource block, every K subcarriers are used for carrying one of the plurality of component groups, wherein K is a position integer.

9. The method of claim 8, wherein upon a frequency domain density value indicated by the frequency domain density information being greater than 1, 12 can be divided exactly by the frequency domain density value, wherein the frequency domain density value is a number of resource elements occupied by a pattern of the CSI-RS per CSI-RS port in each resource block.

10. The method of claim 6, further comprising:
notifying, by the base station, the terminal of a number of resource blocks used by a pattern represented by the plurality of component groups; or
notifying, by the base station, the terminal of positions of resource blocks used by a pattern represented by the plurality of component groups.

11. The method of claim 1, further comprising:
upon the CIS-RS being transmitted by zero power, notifying, by the base station, categories of the components of the CSI-RS resource and a position of each category of components.

12. The method of claim 11, wherein notifying, by the base station, the terminal of the position of each category of components comprises:
notifying, by the base station, the terminal of the position of each category of components by a bitmap manner.

13. The method of claim 1, wherein the information of the components comprises categories of the components and positions of the components, and upon the base station notifying the terminal of the information of the CSI-RS to be transmitted, the method further comprises: performing joint coding in one of following manners:
jointly coding the number of the CSI-RS ports and the categories of the components;
jointly coding positions of at least two of the components;
jointly coding the categories of the components and the positions of the components; or
jointly coding the number of CSI-RS ports and the positions of the components.

14. The method of claim 1, wherein upon the time domain position of the component notified by the base station being not in a downlink transmitting time slot, the method further comprises one of the following:
not transmitting, by the base station, the CSI-RS;
notifying, by the base station, the terminal of a time window, and transmitting the CSI-RS in a first downlink time slot indicated by the notified time window; or
notifying, by the base station, a transmission period of the CSI-RS, and indicating a time domain position of the CSI-RS through a number of downlink time slots contained in a configured radio frame corresponding to the transmission period and a number of downlink time slots contained in a radio frame transmitting the CSI-RS.

15. The method of claim 1, wherein the information of the components comprises frequency domain positions of the components, and notifying, by the base station, the terminal of the frequency domain positions of the components comprises:
selecting, by the base station, one of a plurality of frequency domain positions for the components, and notifying the terminal of the frequency domain position selected for the components, wherein the plurality of frequency domain positions are preset,
wherein in response to determining that the component occupies one subcarrier in a frequency domain, a frequency domain position of any subcarrier in a resource block is allowed to be used as the preset frequency domain position; and in response to determining that the component occupies a plurality of subcarriers in a frequency domain, an allowed spacing between two adjacent preset frequency domain positions in a resource block is two subcarriers.

16. The method of claim 1, further comprising:
notifying, by the base station, the terminal of a category of the CSI-RS.

17. A processor, configured to execute programs, wherein when the processor executes the programs, the processor executes a method for transmitting a CSI-RS
wherein the method comprises:
determining, by a base station, information of the CSI-RS, wherein the information of the CSI-RS at least comprises a number of CSI-RS ports and information of components of a CSI-RS resource, wherein the CSI-RS ports are used for transmitting the CSI-RS, and the CSI-RS resource is used for carrying the CSI-RS;
transmitting, by the base station, the information of the CSI-RS to a terminal; and
transmitting, by the base station, the CSI-RS;
wherein the information of the components comprises time domain positions and frequency domain positions of the components, and notifying, by the base station, the terminal of the information of the components comprises at least one of the following:
notifying, by the base station, the terminal of a position of an earliest orthogonal frequency division multiplexing (OFDM) symbol of the components on the time domain positions and a position of a lowest-frequency subcarrier of the components on the frequency domain positions;
notifying, by the base station, the terminal of a position of a latest OFDM symbol of the components on the time domain positions and a position of a highest-frequency subcarrier of the components on the frequency domain positions; or
notifying, by the base station, the terminal of a position of a latest OFDM symbol of the components on the time domain positions and a position of a lowest-frequency subcarrier of the components on the frequency domain positions.

18. A base station, comprising a processor, a memory and a transceiver; wherein
the memory is configured to store executable instructions;
the transceiver is configured to perform information transceiving communication according to control of the processor; and
the processor is configured to execute following operations:
determining information of channel state information-reference signal,
wherein the information of the CSI-RS at least comprises a number of CSI-RS ports and information of components of a CSI-Rs resource, wherein the CSI-RS ports are configured to transmit the CSI-RS, and the CSI-RS resource is used for carrying the CSI-RS;
sending the information of the CSI-RS to a terminal; and
transmitting the CSI-RS;

wherein the information of the components comprises time domain positions and frequency domain positions of the components, and notifying the terminal of the information of the components comprises at least one of the following:

notifying the terminal of a position of an earliest orthogonal frequency division multiplexing (OFDM) symbol of the components on the time domain positions and a position of a lowest-frequency subcarrier of the components on the frequency domain positions;

notifying the terminal of a position of a latest OFDM symbol of the components on the time domain positions and a position of a highest-frequency subcarrier of the components on the frequency domain positions; or notifying the terminal of a position of a latest OFDM symbol of the components on the time domain positions and a position of a lowest-frequency subcarrier of the components on the frequency domain positions.

19. The base station of claim 18, wherein the components comprise a plurality of component groups, and wherein the processor is further configured to execute the following operation:

notifying the terminal of a plurality of position information of the plurality of component groups, wherein each of the plurality of position information is used for indicating a position configured for each of the plurality of component groups.

* * * * *

UNITED STATES PATENT AND TRADEMARK OFFICE
CERTIFICATE OF CORRECTION

| | |
|---|---|
| PATENT NO. | : 10,833,746 B2 |
| APPLICATION NO. | : 15/733011 |
| DATED | : November 10, 2020 |
| INVENTOR(S) | : Yong Li |

It is certified that error appears in the above-identified patent and that said Letters Patent is hereby corrected as shown below:

In the Specification

In Column 13, Line 60, delete "RBS" and insert --RBs--.

In the Claims

In Column 25, Line 39, Claim 1, delete "notifying" and insert --notifying,--.

In Column 25, Line 43, Claim 1, delete "positions," and insert --positions;--.

In Column 27, Line 24, Claim 11, delete "CIS-RS" and insert --CSI-RS--.

In Column 28, Line 63, Claim 18, delete "CSI-Rs" and insert --CSI-RS--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*